US009947192B2

(12) United States Patent
Hawes et al.

(10) Patent No.: US 9,947,192 B2
(45) Date of Patent: Apr. 17, 2018

(54) METAL-THEFT DETECTION DEVICE

(71) Applicant: Pan-Optic Monitoring Limited, Winsford, Cheshire (GB)

(72) Inventors: Andrew Robert Hawes, Winsford (GB); Jason Kirk Lawler, Whitworth (GB); James Lincoln Bryan, Stamford (GB); Simon James Dineen, Stamford (GB); John Matthews, North Shields (GB)

(73) Assignee: Pan-Optic Monitoring Limited, Winsford, Cheshire (GB)

( * ) Notice: Subject to any disclaimer, the term of this patent is extended or adjusted under 35 U.S.C. 154(b) by 0 days.

(21) Appl. No.: 15/303,235

(22) PCT Filed: Mar. 27, 2015

(86) PCT No.: PCT/GB2015/050928
§ 371 (c)(1),
(2) Date: Oct. 11, 2016

(87) PCT Pub. No.: WO2015/155504
PCT Pub. Date: Oct. 15, 2015

(65) Prior Publication Data
US 2017/0039830 A1 Feb. 9, 2017

(30) Foreign Application Priority Data
Apr. 11, 2014 (GB) .................................. 1406564.3

(51) Int. Cl.
*G08B 13/14* (2006.01)
*G08B 13/22* (2006.01)
(Continued)

(52) U.S. Cl.
CPC ............. *G08B 13/22* (2013.01); *G08B 25/10* (2013.01); *G08B 25/08* (2013.01)

(58) Field of Classification Search
CPC ......... G08B 13/22; G08B 25/10; G08B 25/08
(Continued)

(56) References Cited

U.S. PATENT DOCUMENTS 7,723,612 B2 * 5/2010 Butler ..................... F21S 8/086
174/40 R
8,860,580 B1 * 10/2014 Wong ....................... H02H 7/26
340/568.2
(Continued)

FOREIGN PATENT DOCUMENTS

CN 201196674 Y 2/2009
CN 101504430 A 8/2009
(Continued)

OTHER PUBLICATIONS

UK Intellectual Property Office Search Report, Application No. GB1406564.3, dated Sep. 26, 2014, 5 pages.
(Continued)

*Primary Examiner* — Toan N Pham
(74) *Attorney, Agent, or Firm* — Ziegler IP Law Group, LLC

(57) ABSTRACT

A metal-theft detection device includes a first sensing terminal configured to be electrically coupled with an earth wire of a mains electricity circuit, a second sensing terminal configured to be electrically coupled with a neutral wire of the mains electricity circuit, a wireless communications module, and circuitry configured to measure a resistance of a conductive path connected between the first and second sensing terminals, and to cause the wireless communications module to transmit a wireless message based on the measured resistance.

21 Claims, 1 Drawing Sheet

(51) Int. Cl.
    *G08B 25/10*    (2006.01)
    *G08B 25/08*    (2006.01)
(58) Field of Classification Search
    USPC .......... 340/568.1, 568.2, 660, 571; 700/292, 700/298
    See application file for complete search history.

(56) References Cited

U.S. PATENT DOCUMENTS

| | | |
|---|---|---|
| 2002/0130777 A1 | 9/2002 | Besnard |
| 2005/0231365 A1 | 10/2005 | Tester et al. |
| 2010/0085189 A1* | 4/2010 | Caswell ............. G08B 13/1409 340/571 |
| 2010/0328072 A1 | 12/2010 | Price et al. |
| 2012/0105230 A1 | 5/2012 | Bockstoce et al. |

FOREIGN PATENT DOCUMENTS

| | | |
|---|---|---|
| CN | 201820326 U | 5/2011 |
| ES | 2446847 A1 | 3/2014 |
| KR | 100888272 B1 | 3/2009 |
| WO | 2013024325 A1 | 2/2013 |
| ZA | 9605840 B | 3/1997 |

OTHER PUBLICATIONS

International Search Report and Written Opinion of the International Searching Authority, Application No. PCT/GB2015/050928, dated Jul. 6, 2015, 14 pages.

* cited by examiner

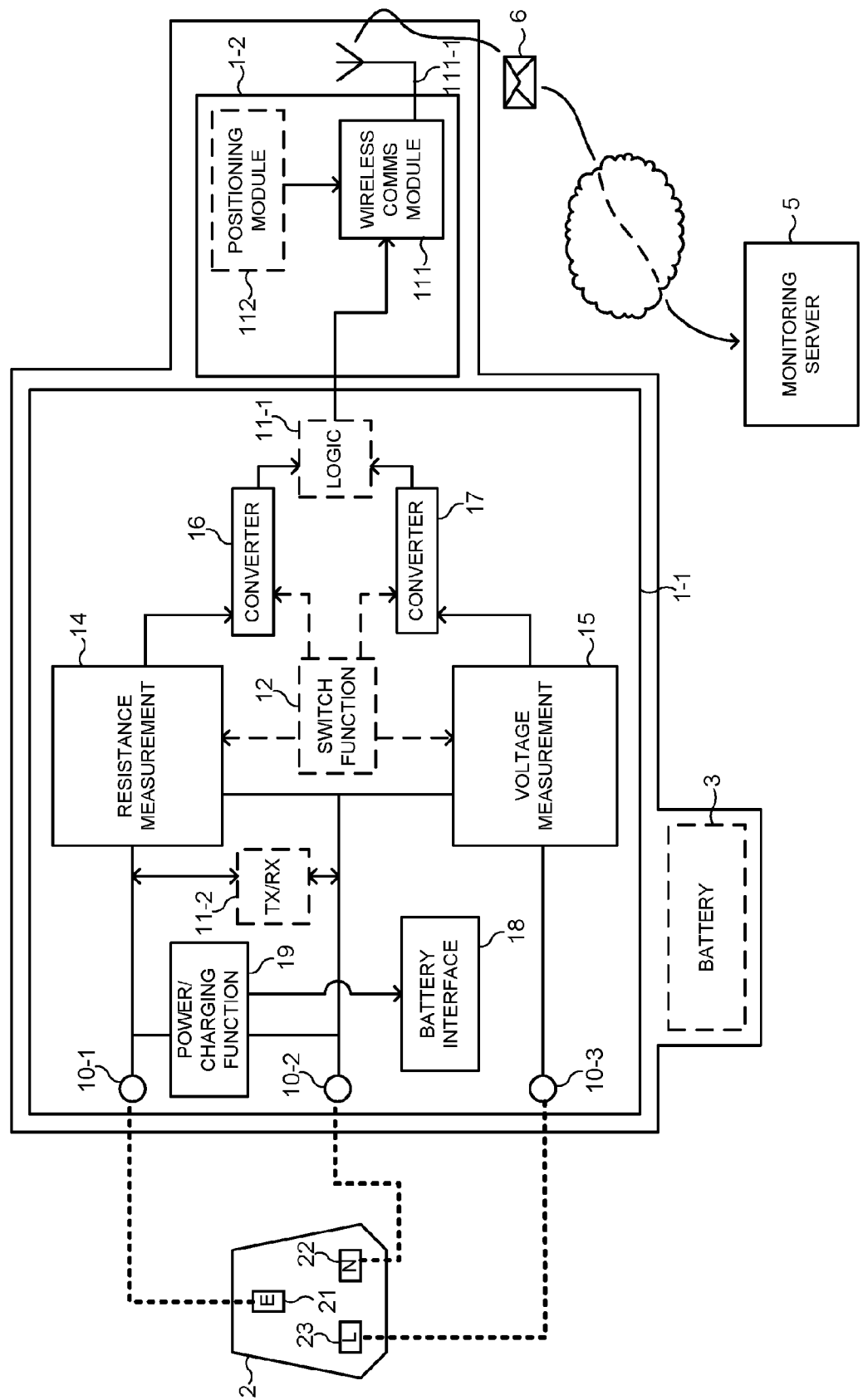

METAL-THEFT DETECTION DEVICE

FIELD

This specification relates to a device for detecting theft of conductive material, such as metal, from a conductive network. The specification also relates to circuitry which forms part of the device.

BACKGROUND

Theft of conductive materials, such as metal, has long been a problem due to the high monetary value of the materials. For instance, the high scrap value of copper and aluminium, which are commonly used in the manufacture of electrical cables, water pipes and the like, makes the cables, pipes etc. an attractive target for theft. Such theft can be both expensive to repair and extremely disruptive to people who rely on the infrastructure of which the cables, pipes etc are part. Metal theft commonly occurs in respect of rail systems and electricity networks and, in both cases, is very disruptive. Metal theft can occur if a network is energised or de-energised. Thieves stealing from an energised network may first isolate the network or may instead sever the network (thereby to de-energise it) prior to removal of the metal.

SUMMARY

In a first aspect, this specification describes a metal-theft detection device comprising: a first sensing terminal configured to be electrically coupled with an earth wire of a mains electricity circuit; a second sensing terminal configured to be electrically coupled with a neutral wire of the mains electricity circuit; a wireless communications module; and circuitry configured: to measure a resistance of a conductive path connected between the first and second sensing terminals; and to cause the wireless communications module to transmit a wireless message based on the measured resistance.

The metal-theft detection device may comprise a third sensing terminal configured to be electrically coupled with a live wire of the mains electricity circuit, and the circuitry may be further configured to measure a voltage between the second and third sensing terminals, and to cause the wireless communications module to transmit a wireless message based on the measured voltage. The circuitry may be configured to determine, based on the measured voltage, if a pre-determined voltage criterion has been satisfied, and to cause the wireless communications module to transmit the wireless message based on the measured voltage only if it is determined that the pre-determined voltage criterion has been satisfied. The circuitry may be configured to detect whether the mains electricity circuit has become de-energised, and in response to detecting that the mains electricity circuit has become de-energised, to switch from causing transmission of wireless messages based on the measured voltage to causing transmission of wireless messages based on the measured resistance.

The circuitry may be configured to detect whether the mains electricity circuit is de-energised, and in response to detecting that the mains electricity circuit is de-energised, to initiate transmission of wireless messages based on the measured resistance.

The circuitry may be configured to determine, based on the measured resistance, if a pre-determined resistance criterion has been satisfied, and to cause the wireless communications module to transmit the wireless message based on the measured resistance only if it is determined that the pre-determined resistance criterion has been satisfied.

The metal-theft detection device may further comprise a battery and the circuitry may be configured, when the mains electricity circuit is energised, to utilise power from the mains electricity circuit and, when the mains electricity circuit is de-energised, to utilise power from the battery.

The metal-theft detection device may be adapted for connection with an electrical plug for plugging into an electrical socket of the mains electricity circuit such that, when the device is connected to the electrical plug, the first sensing terminal is electrically connected to an earth terminal of the electrical plug and the second sensing terminal is electrically connected to a neutral terminal of the electrical plug.

The metal-theft detection device may comprise an electrical plug for plugging into an electrical socket of the mains electricity circuit, the first sensing terminal being electrically connected to an earth terminal of the electrical plug and the second sensing terminal being electrically connected to a neutral terminal of the electrical plug.

The circuitry may comprise an analogue to digital converter for converting analogue signals indicative of the measured resistance into digital signals indicative of the measured resistance. The wireless message transmitted by the wireless communications module based on the measured resistance may be based on the digital signal indicative of the measured resistance In a second aspect, this specification describes a device for detecting theft of electrically conductive material, the device comprising first and second sensing terminals, a wireless communications module, and circuitry configured to measure a resistance of a conductive path connected between the first and second sensing terminals and to cause the wireless communications module to transmit a wireless message based on the measured resistance. The device may comprise a third sensing terminal and the circuitry may be further configured to measure a voltage between the second and third sensing terminals and to cause the wireless communications module to transmit a wireless message based on the measured voltage. The circuitry may be configured to detect whether a conductive network with which the conductive path is associated has become de-energised, and in response to detecting that the conductive network has become de-energised, to switch from causing transmission of wireless messages based on the measured voltage to causing transmission of wireless messages based on the measured resistance. The device may be adapted for connection with an electrical plug for plugging into an electrical socket of the mains electricity circuit such that, when the device is connected to the electrical plug, the first sensing terminal is electrically connected to a first terminal of the electrical plug and the second sensing terminal is electrically connected to a second terminal of the electrical plug. The device may comprise an electrical plug for plugging into an electrical socket of the mains electricity circuit, the first sensing terminal being electrically connected to a first terminal of the electrical plug and the second sensing terminal being electrically connected to a second terminal of the electrical plug.

In a third aspect, this specification describes circuitry for a metal-theft detection device, the circuitry comprising first, second and third sensing terminals and being configured to measure a resistance of a conductive path connected between the first and second sensing terminals, to measure a voltage between the second and third sensing terminals, to determine whether a conductive network with which the conductive path is associated is energised, when it is determined that the conductive network with which the conductive path is associated is energised, to provide signals in dependence on the measured voltage, and, when it is determined that the conductive network with which the conductive path is associated is de-energised, to provide signals in dependence on the measured resistance.

BRIEF DESCRIPTION OF THE FIGURES

For a more complete understanding of example embodiments of the present invention, reference is now made to the following description taken in connection with FIG. 1 which is a simplified block diagram of a metal-theft detection device which illustrates various aspects of the present invention.

DETAILED DESCRIPTION OF THE FIGURES

In the description and drawing, like reference numerals refer to like elements throughout.

FIG. 1 is a simplified block diagram of a metal-theft detection device 1 which illustrates various aspects of the present invention. In FIG. 1, some of the optional components and connections are shown using dashed lines. In addition, as FIG. 1 is illustrative only, certain components and/or connections of the device 1 may not be shown.

In general terms, the metal theft detection device 1 is configured to allow detection of changes in at least one parameter associated with a conductive network (not shown) with which the metal theft detection device 1 is coupled. The changes in parameters may be indicative of the removal or theft of metal from the conductive network. As such, the device 1 enables detection of the removal or theft of the metal.

The metal theft detection device 1 is configured to transmit wireless messages 6 including information indicative of at least one parameter associated with the conductive network.

A monitoring server 5 may receive these messages 6 (or at least the indicative information) and may be configured to determine, based on the indicative information, whether a theft of metal from the conductive network might have occurred. In response to determining that metal theft might have occurred, the monitoring server 5 may alert the relevant parties.

In other embodiments, the metal theft detection device 1 may be configured to determine based on the measurements of parameters associated with the conductive network whether metal theft has possibly occurred. In response to such a determination, the metal theft detection device 1 may be configured to transmit a wireless message 6 indicating that metal theft might have occurred. This message may be transmitted to the relevant parties directly or via an intermediary such as the monitoring server 5.

Examples of conductive networks with which the device 1 may be coupled include, but are not limited to, electricity networks (such as a mains electricity network) and water pipe or gas pipe networks (such as plumbing or central heating networks).

The parameters which the device 1 is configured to measure may include at least one of a resistance associated with a conductive network and a voltage associated with the conductive network. In some embodiments, such as that of FIG. 1, the device 1 may be capable of measuring both the voltage and the resistance. The device 1 may be configured to measure these different parameters concurrently or may be configured such that only one of the parameters can be measured at any particular time.

The measured resistance can be used to determine if metal has been removed from a particular conductive network because, due to the high electrical conductivity of metal (i.e. the relatively low resistance), the measured resistance may increase if metal is removed from the network. The increase in resistance will be particularly significant if metal theft results in the conductive network becoming discontinuous (i.e. having parts in which metal is not present). The measured resistance can be used to determine if metal has been stolen from a de-energised conductive network.

The measured voltage can be used to determine if metal has been stolen from an energised conductive network, such as a mains electricity circuit. This is because the removal of metal from the network will result in a significant decrease in the detected voltage.

The metal theft detection device 1 of any of the above described embodiments may be adapted for connection with an electrical plug 2 suitable for plugging into an electrical socket of a mains electricity circuit. The electrical plug may be of a standardised type suitable for use with a particular format of socket. The format of the socket in most cases is dependent on the geographic location of the mains electricity circuit. In such embodiments, the metal theft detection device 1 is configured to allow detection, in any of the ways described above, of theft of metal from a mains electricity circuit.

In such embodiments, the metal theft detection device 1 may comprise the electrical plug 2 such that the device 1 itself is plugabble (i.e. can be plugged) into the mains electricity socket. The plug 2 may be decouplable from the device 1, for instance using another plug-socket arrangement. In some instances, an intermediary electrical cable or lead may be provided between the plug 2 and the device 1. In other embodiments, the plug 2 may be integrally formed with the device 1 such that they cannot be decoupled from one another. In some examples, the integrally-formed plug may be fixed in position (i.e. may be immovable) relative to a main body of the device.

As will be appreciated from the below explanation, the device 1 may additionally or alternatively be connectable to the conductive network via any suitable connection mechanism (for instance, cables and suitable connectors for connecting the cables to the network). Such embodiments may be particularly suitable for allowing detection of metal theft from non-electricity networks.

The metal-theft detection device 1 comprises plural sensing terminals 10-1, 10-2, 10-3. The device 1 is configured such that, when at least two of the sensing terminals 10-1, 10-2, 10-3 are coupled to the conductive network, the parameters of the network can be measured. In embodiments, such as that shown in FIG. 1, the device 1 comprises first, second and third sensing terminals 10-1, 10-2, 10-3.

In embodiments in which the device 1 is adapted for connection with an electrical plug 2, the device is configured such that each of the sensing terminals 10-1, 10-2, 10-3 is electrically connected or electrically connectable to a different one of the electrical contacts 21, 22, 23 (at least some of which may be "pins") of the plug 2. More specifically, the device 1 is configured such that the first sensing terminal 10-1 is connected or connectable to the earth contact 21 of the plug 2, the second sensing terminal 10-2 is connected or connectable to the neutral terminal 22 of the plug 2 and the third terminal 10-3 is connected or connectable to the live terminal 23 of the plug 2. For reasons that will be appreciated, the first, second and third sensing terminals 10-1, 10-2, 10-3 may, therefore, in such embodiments be referred to as the earth, neutral and live sensing terminals respectively.

The device 1 further comprises resistance measurement circuitry 14 (or resistance measurement functionality) configured to measure the resistance associated with a conductive network with which the device is coupled. The resistance measurement circuitry 14 is electrically connected with two of the sensing terminals 10-1, 10-2. Specifically, the resistance measurement circuitry 14 is electrically connected with each of the first and second sensing terminals 10-1, 10-2 and is configured to measure the resistance of a conductive path of the network connected between those terminals. In mains electricity implementations, the resistance measurement circuitry 14 is configured to measure the resistance of a conductive path connected between the earth sensing terminal 10-1 and the neutral sensing terminal 10-1. Put another way, the device is configured to measure a resistance associated with conductive path connected between the earth and neutral contacts 21, 22 of the plug 2.

The metal theft detection device 1 further comprises a first analogue-to-digital converter (ADC) 16. The first ADC 16 is configured to receive an analogue signal and to convert the analogue signal into a digital signal. The resistance measurement circuitry 14 is configured to output or provide an analogue signal indicative of the measured resistance to the first ADC 16 which converts it into a digital signal indicative of the measured resistance.

The device 1 may further comprise voltage measurement circuitry 15 (or voltage measurement functionality) configured to measure the voltage associated with a conductive network with which the device 1 is coupled associated. The voltage measurement circuitry 15 is electrically connected with two of the sensing terminals 10-2, 10-3. Specifically, the voltage measurement circuitry 15 is electrically connected with each of the second and third sensing terminals 10-2, 10-3 and is configured to measure the voltage across the two terminals 10-2, 10-3. In mains electricity implementations, the voltage measurement circuitry 15 is configured to measure the voltage across the neutral sensing terminal 10-2 and the live sensing terminal 10-3. Put another way, the device is configured to measure a voltage across the neutral and live contacts 22, 23 of the electrical plug 2.

The metal theft detection device 1 may further comprise a second analogue-to-digital converter (ADC) 17. The second ADC 17 is configured to receive an analogue signal and to convert the analogue signal into a digital signal. The voltage measurement circuitry 15 is configured to output or provide an analogue signal indicative of the measured voltage to the second ADC 17 which converts it into a digital signal indicative of the measured voltage.

Although first and second ADCs 16, 17 are shown in the example of FIG. 1, it will be appreciated that a single ADC may be used, with the device 1 being configured such that the single ADC receives analogue outputs from both of the voltage and resistance measurement circuitries 16, 17.

The first and second ADCs 16, 17 are connected directly or indirectly with the wireless communications module 111. Put another way, the ADCs 16, 17 output digital signals indicative of their respective parameters to the wireless communications module 111. The digital signals may be passed directly from the ADC 16, 17 to the wireless communications module 111 or, in some embodiments, may be passed to the wireless communications module 111 via additional logic circuitry 11-1.

The wireless communications module 111 is configured to create a wireless message including information, based on one or more digital signals received from one or both of the ADCs 16, 17, indicative of one or more of the measured parameters. More specifically, the wireless communications module 111 may be configured to create a wireless message including information indicative of the measured resistance, based on one or more digital signals received from the first ADC 16. Similarly, the wireless communications module 111 may be configured to create a wireless message including information indicative of the measured voltage, based on one or more digital signals received from the second ADC 17.

The wireless communications module has an associated antenna 111-1 via which the created wireless messages 6 are transmitted. The wireless communications module 111 may be configured to transmit messages of any suitable format using any suitable transmission protocol. For instance, the wireless communications module 111 may be configured to transmit SMS or IP messages via a cellular network.

As discussed above, some embodiments of the metal theft detection device may include additional logic circuitry 11-1. The additional logic circuitry 11-1 may be configured to receive signals from one or both of the ADCs 16, 17. The additional logic circuitry 11-1 may, in some embodiments, be operable to determine based on the measurements of parameters associated with the conductive network whether metal theft has possibly occurred. Put another way, the additional logic circuitry 11-11 may be operable to determine if the measured parameter(s) satisfies a predetermined criterion. For example, the additional logic circuitry 11-1 may be configured to calculate a difference between successive measurements from one of the voltage and resistance measurement circuitries 14, 15. The additional logic circuitry 11-1 may then compare the calculated difference with a threshold and, if the difference exceeds the threshold value may determine that metal theft may have occurred. Alternatively or additionally, the additional logic circuitry 11-1 may be configured to compare each measured value with a threshold, thereby to determine if metal theft has occurred. For example, if the measured voltage drops below a particular threshold value, it may be determined that a metal theft may have occurred. Similarly, if the measured resistance rises above a particular value, it may be determined that a metal theft has occurred. The threshold value and the threshold difference may be user-definable. As another example, the additional logic circuitry 11-1 may be configured to determine if the measured parameters fall within an allowable range. If the parameter(s) falls outside the allowable range, the additional logic circuitry 11-1 may determine that a metal theft may have occurred.

Regardless of how it is determined, if the additional logic circuitry 11-1 determines that a metal theft has possibly occurred, it may cause a signal to be passed to the wireless communications module 111 for causing a wireless message to be sent. The signal may include information indicative of the measured parameter and/or the change in the measured parameter for inclusion in the wireless message.

In some specific examples, the additional logic circuitry 11-1 may cause a signal to be provided to the wireless communications module 111 in response to detection of any change in the measure parameters. In such examples, while no change in parameters is detected, no signals are provided to the wireless communications module and so no wireless messages are transmitted.

The additional logic circuitry 11-1 may alternatively or additionally provide functionality other than determining if metal theft has possibly occurred. For instance, the additional logic circuitry 11-1 may be configured, in addition or alternatively, to determine based on signals received from the voltage measurement circuitry 15 whether or not the conductive network is de-energised. This may be determined, for example, based on signals received from the voltage measurement circuitry, for instance via the second ADC 17. The additional logic circuitry 11-1 may respond to a determination that the conductive network has become de-energised by causing a signal, for causing a message to be transmitted, to be passed to the communications module 111. As such, the device may be configured to cause a message to be sent when it is determined that the network has become de-energised.

The additional logic circuitry 11-1 may be configured to control operation of the ADCs 16, 17. For instance, the additional logic circuitry 11-1 may control the ADCs 16, 17 to enter and exit a sleep mode in which measured parameter values are not converted. More specifically, the additional logic circuitry 11-1 may be configured to wake-up the ADCs 16, 17 (to convert the received signals) at a pre-determined frequency and then to set the ADCs 16, 17 back into sleep mode after a pre-determined duration. The additional logic circuitry 11-1 may, in some embodiments, only control the ADCs 16, 17 in this way when it is determined that the conductive network is not energised (i.e. when the battery is being used to power the device and so reduced power consumption is more important).

The additional logic circuitry 11-1 may comprise any combination of one or more microcontrollers (not shown) and/or one or more application specific integrated circuits (not shown) and/or one or more FPGAs. Each of the one or more microcontrollers may comprise one or more processors and at least one computer-readable memory medium having computer-readable code stored thereon. The additional logic circuitry 11-1 may include its own timing chip. This may be of use, for instance, in setting the rate at which the voltage and or resistance is measured and/or for data/time stamping messages transmitted by the device 1.

As will be appreciated, in some embodiments, the device 1 may not include the additional logic circuitry 11-1. Instead, the outputs of the ADCs 16, 17 may be provided directly to the wireless communications module 111, which periodically sends wireless messages including parameter information which is based on the values of the outputs of the ADCs 16, 17. In such embodiments, the determination as to whether metal theft may have occurred may be performed by the monitoring server 5.

In some embodiments, the device 1 comprises transceiver (TX/RX) circuitry 11-2 which is in communication with each of the first and second sensing terminals 10-1, 10-2. The TX/RX circuitry 11-2 is configured to transmit a signal, for instance a digital signal, into the conductive path connected between the first and second sensing terminals 10-1, 10-2, via one of the first and second sensing terminals 10-1, 10-2. The TX/RX circuitry 11-2 is then configured to detect receipt of the transmitted signal via the other one of the first and second sensing terminals 10-2, 10-3. If it is detected that the signal is received, it is determined that the conductive path connected between the two terminals has not been tampered with. If, on the other hand, receipt of the signal is not detected by the TX/RX circuitry 11-2, the TX/RX circuitry may respond by causing the wireless communications module to transmit a message 6 indicating that the conductive network with which the device is coupled may have has been tampered with. In embodiments in which, the device 2 is coupled to an electricity circuit, the signals is transmitted into the earth or neutral wire of the electricity circuit and is, if the circuit has not been tampered with, is received back via the other one of the earth and neutral wires. Although in FIG. 1 the TX/RX circuitry 11-2 is depicted as a different module to the additional logic circuitry 11-1, the above described functionality of the TX/RX circuitry 11-2 may instead be provided by the additional logic circuitry 11-1.

The device 1 may, in some embodiments, comprise a positioning module 112, which is configured to determine the geographic location of the device 1. The positioning module 112 may be of any suitable type. For instance, the positioning module 112 may be a GPS module. A signal indicative of the location of the device 1 may be passed from the positioning module 112 to the wireless communications module 111. The wireless communications module 111 may include in a wireless message, based on the signal received from the positioning module 112, information indicative of the geographic location of the device 112. The location information may be included in the same message as the parameter information. In this way, the monitoring server 5 may be able to determine the location of the device 1 and thus also of the conductive network in respect of which the metal theft has occurred. Alternatively or additionally, the device 2 may be configured to determine its location using "cell location" (for instance based on the base station with which it is communicating).

The device 1 may include a port (not shown) via which the device 1 can establish a wired connection with a computing device (for instance, a laptop computer, a tablet computer, a desktop computer or a smartphone). The port may be of any suitable type. For instance, the port may be a UART. The wired connection may be used to configure the operating parameters of the metal theft detection device 1. These parameters may include among other things, the frequency at which wireless messages are sent and/or the rate at which the digital signals indicative resistance and/or voltage are provided by the ADCs 16, 17. Other user-definable parameters include the frequency at which the ADCs are woken-up from sleep mode and the duration for which they remain awake before re-entering sleep mode.

Alternatively or additionally, the device 1 may be configured such that its operating parameters can be adjusted using control messages wirelessly received via the wireless communications module 111. For instance, control information from the control messages may be passed from the wireless communications module 111 to the additional logic circuitry 11-1 which causes the operating parameters of the device 1 to be adjusted. Messages received via the wireless communications module 111 may be, for example, SMS messages or IP messages. A wired connection via the port and/or wirelessly received control messages may be used to provide the device 1 with new or updated firmware and/or software. The new or updated firmware and/or software may be used by, for instance, one or more of the additional logic circuitry 11-1, the TX/RX circuitry 11-2, the communications module 111, and the positioning module 112.

The device 1 may comprise plural separate circuit boards 1-1, 1-2. In some specific embodiments, a selection or all of the following components may be provided on a first circuit board 1-1: the first, second and third sensing terminals 10-1, 10-2, 10-3, the voltage measurement circuitry 15, the resistance measurement circuitry 14, the first ADC 16 and the second ADC 17. The first circuit board 1-1 may further include the battery interface 18 and/or the power supply/charging circuitry 19. The port, where included in the device 1, may be provided on the first circuit board 1-1. In embodiments in which the device 1 includes one or more of them, the first circuit board 1-1 may include the switch circuitry 12, the additional logic circuitry 11-1, and/or the TX/RX circuitry 11-2. The wireless communications module 111 and, optionally, the positioning module 112 may be provided on a second circuit board 1-2. In some embodiments, the additional logic circuitry may be provided on the second circuit board 1-2. The first and second circuit boards 1-1, 1-2 may be printed circuit boards (PCBs).

In some embodiments, the device 1 is configured to transmit wireless messages including information indicative of only the voltage, when the conductive network (such as the mains electricity circuit) is energised, and to transmit wireless messages including information indicative of only the resistance, when the conductive network is not energised. The device 1 may be configured, if the conductive network becomes de-energised while the device is connected to the network, to switch from transmitting wireless messages including information indicative of the voltage to transmitting wireless messages including information indicative of resistance.

This functionality may be implemented in any suitable way. For instance, in some embodiments, the device 1 may comprise switching circuitry 12 which is configured to cause switching from transmitting wireless messages including information indicative of the voltage to transmitting wireless messages including information indicative of resistance and vice versa.

In some embodiments, the switching circuitry 12 may be configured to selectively activate the resistance measurement circuitry 14 in dependence on whether the network is energised. Specifically, the switching circuitry 12 may activate the resistance measurement circuitry 14 when it is determined that the network is not energised. In such embodiments, when the network is energised, the resistance measurement circuitry 14 may be deactivated such that signals indicative of the resistance associated with the conductive network are not provided to the first ADC 16. As such, when the network is energised, a digital signal indicative of the resistance may not be provided by the ADC 16 to the wireless communications module 112. Similarly, the switching circuitry 12 may be configured to cause the voltage measurement circuitry 15 to be activated when the conductive network is energised and to be deactivated when the conductive network is de-energised.

In other embodiments, the switching circuitry 12 may be configured to cause activation of the first ADC 14 when it is detected that the network is not energised, with the first ADC 16 being deactivated when the network is energised. In this way, although the resistance measurement circuitry 14 may still be active such that values of the resistance are being measured, the deactivation of the first ADC 16 means that signals indicative of the measured resistance do not reach the wireless communications module 111. As such information indicative of the resistance is not included in the wirelessly transmitted messages. Similarly, the second ADC 17 may be caused to be activated by the switching circuitry 12 when the conductive network is energised and may be caused to be inactive when the conductive network is de-energised. As such, when the conductive network is de-energised, signals indicative of the measured voltage may not reach the wireless communications module 111.

In other examples, the functionality of the switching circuitry 12 may be performed by the additional logic circuitry 11-1. As such, the additional logic circuitry 11-1 may be configured to pass signals indicative of the resistance (as received from the first ADC 16) only when it is determined that the conductive network is de-energised. When it is determined that the conductive network is energised, the additional logic circuitry 11-1 may block signals indicative of the resistance such that they are not passed to the wireless communications module 111. In this way, although both the resistance measurement circuitry 14 and the first ADC 16 may be active when the conductive network is energised, signals indicative of the measured resistance do not reach the wireless communications module. Similarly, the additional logic circuitry 11-1 may be configured to pass signals indicative of the voltage (as received from the second ADC 12) when it is determined that the conductive network is energised and to block signals indicative of the voltage when it is determined that the conductive network is de-energised.

In yet other examples, the functionality of the switching circuitry 12 may be provided by the wireless communications module 111 such that, when it is determined that the conductive network is de-energised, the wireless communications module 111 includes, in the wireless message, information indicative of the resistance and not information indicative of the voltage. The wireless communications module 111 may additionally, when it is determined that the conductive network is not energised, include in the wireless message information indicative of the voltage and not information indicative of the resistance.

In all of the above-described examples, whether or not the conductive network is energised may be determined in any suitable way. For instance, it may be determined based on the signal output by the voltage measurement circuitry 15. For example, if the voltage is measured to be zero, this may be taken as an indication that the network has become de-energised. As mentioned previously, whether or not the conductive network is energised may be determined by the additional logic circuitry 11-1.

The device 1 is configured such that, when it is coupled to an energised network (e.g. a mains electricity circuit), it draws the power required for its operation from the energised conductive network. This may be achieved using power supply circuitry 19, which is connected to the live and neutral sensing terminals 10-3, 10-2 and which is configured to draw power from the energised conductive network and to convert the energy into a form that is suitable for use by other components of the device which require power. These include the wireless communications module 111 and, in embodiments which include such, a positioning module 112. Other components which may receive power from the power supply circuitry 19 include one or both of the ADCs 16, 17, the resistance measurement circuitry 14, the additional logic circuitry 11-1 and/or the TX/RX circuitry 11-2.

The metal theft detection device 1 further comprises a battery interface 18 which is configured for connection to a battery 3. The device 1 is configured such that, when the network with which it is coupled is not energised, the device 1 utilises energy received from the battery 3 via the battery interface 18. More specifically, the device 1 may be configured such that, when the conductive network with which the device 1 is coupled is not energised, at least the resistance measurement circuitry 14, the first ADC 16 and the wireless communications module 111 are provided with power from the battery 3. In some embodiments, the positioning module 112 and/or the additional logic 11 may also receive power from the battery 3.

The power supply circuitry 19 may be further configured, when the conductive network is energised, to covert power from the energised network for charging the battery 3. The power supply circuitry 19 may therefore be coupled to the battery interface 18. In view of this functionality, the power supply circuitry 19 may be referred to as a "charging circuitry" or "power supply and charging circuitry".

Although not shown in FIG. 1, it will appreciated that the device 1 may have further functionality for detecting potential interference with the conductive network with which it is coupled and/or the device 1 itself. For example, the metal theft detection device 1 may include a light sensor for determining when light is incident on the device 1. Messages may be caused to be transmitted in response to a change in output of the light sensor. This may be useful in scenarios in which the device is utilised in an empty building or warehouse which is usually dark. In such a scenario, detected light may be indicative of intruders who may be potential metal thieves. The metal theft detection device 1 may also or alternatively include a motion sensor for determining when the device is being moved. A message may be caused to be transmitted based on the output of the motion sensor, with movement of the device being a potential precursor to tampering or stealing.

As will be understood from the above description, metal-theft detection devices as described herein are very versatile and may be utilised to detect metal theft in a number of different types of conductive networks. They may be particularly useful for detecting metal theft in networks which may switch between being energised and being de-energised.

As will of course be appreciated, the term the "device 1 being/is configured/arranged/operable/adapted to" as used herein may be taken to mean that "the circuitry is configured/arranged/operable/adapted to".

As used in this application, the term 'circuitry' may refer to one or more of the following: hardware-only circuit implementations (such as implementations in only analogue and/or digital circuitry); combinations of hardware-only circuits and software (and/or firmware) stored on computer readable memory media and executed by one or more processors or portions of processor(s)/software; and circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, an integrated circuit or application specific integrated circuit.

Reference to "computer-readable memory medium", "computer program product", "tangibly embodied computer program" etc, or a "processor" or "processing circuitry" etc. should be understood to encompass not only computers having differing architectures such as single/multi processor architectures and sequencers/parallel architectures, but also specialised circuits such as field programmable gate arrays FPGA, application specific integrated circuits (ASIC), signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc. The computer-readable memory media described herein may comprise one or both of volatile memory and non-volatile memory. Examples of volatile memory include RAM, DRAM, SDRAM etc. Examples of non-volatile memory include ROM, PROM, EEPROM, flash memory, optical storage, magnetic storage, etc.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:
1. A metal-theft detection device comprising:
a first sensing terminal configured to be electrically coupled with an earth wire of a mains electricity circuit;
a second sensing terminal configured to be electrically coupled with a neutral wire of the mains electricity circuit;
a third sensing terminal configured to be electrically coupled with a live wire of the mains electricity circuit;
a wireless communications module; and
circuitry configured:
to measure a resistance of a conductive path connected between the first and second sensing terminals;
to cause the wireless communications module to transmit one or more wireless messages based on the measured resistance;
to measure a voltage between the second and third sensing terminals; and
to cause the wireless communications module to transmit one or more wireless messages based on the measured voltage.

2. The metal-theft detection device of claim 1, wherein the circuitry is configured:
to determine, based on the measured voltage, if a pre-determined voltage criterion has been satisfied; and
to cause the wireless communications module to transmit the one or more wireless messages based on the measured voltage only if it is determined that the pre-determined voltage criterion has been satisfied.

3. The metal-theft detection device of claim 1, wherein the circuitry is configured:
to detect whether the mains electricity circuit has become de-energised; and
in response to detecting that the mains electricity circuit has become de-energised, to switch from causing transmission of wireless messages based on the measured voltage to causing transmission of wireless messages based on the measured resistance.

4. The metal-theft detection device of claim 1, wherein the circuitry is configured:
to detect whether the mains electricity circuit is de-energised; and
in response to detecting that the mains electricity circuit is de-energised, to initiate transmission of the one or more wireless messages based on the measured resistance.

5. The metal-theft detection device of claim 1, wherein the circuitry is configured:
to determine, based on the measured resistance, if a pre-determined resistance criterion has been satisfied; and to cause the wireless communications module to transmit the one or more wireless messages based on the measured resistance only if it is determined that the pre-determined resistance criterion has been satisfied.

6. The metal-theft detection device of claim 1, further comprising a battery, wherein the circuitry is configured:
when the mains electricity circuit is energised, to utilise power from the mains electricity circuit; and
when the mains electricity circuit is de-energised, to utilise power from the battery.

7. The metal-theft detection device of claim 1, wherein the device is adapted for connection with an electrical plug for plugging into an electrical socket of the mains electricity circuit such that, when the device is connected to the electrical plug, the first sensing terminal is electrically connected to an earth terminal of the electrical plug and the second sensing terminal is electrically connected to a neutral terminal of the electrical plug.

8. The metal-theft detection device of claim 1, comprising an electrical plug for plugging into an electrical socket of the mains electricity circuit, the first sensing terminal being electrically connected to an earth terminal of the electrical plug and the second sensing terminal being electrically connected to a neutral terminal of the electrical plug.

9. The metal-theft detection device of claim 1, the circuitry comprising:
an analogue to digital converter for converting analogue signals indicative of the measured resistance into digital signals indicative of the measured resistance.

10. The metal-theft detection device of claim 9, wherein the one or more wireless messages transmitted by the wireless communications module based on the measured resistance are based on the digital signal indicative of the measured resistance.

11. A metal-theft detection device comprising:
a first sensing terminal configured to be electrically coupled with an earth wire of a mains electricity circuit;
a second sensing terminal configured to be electrically coupled with a neutral wire of the mains electricity circuit;
a third sensing terminal configured to be electrically coupled with a live wire of the mains electricity circuit;
a wireless communications module; and
circuitry configured:
to measure a voltage between the second and third sensing terminals;
to cause the wireless communications module to transmit a wireless message based on the measured voltage;
to measure a resistance of a conductive path connected between the first and second sensing terminals;
to cause the wireless communications module to transmit a wireless message based on the measured resistance;
to detect whether the mains electricity circuit has become de-energised; and
in response to detecting that the mains electricity circuit has become de-energised, either:
to switch from causing transmission of wireless messages based on the measured voltage to causing transmission of wireless messages based on the measured resistance, or
to initiate transmission of wireless messages based on the measured resistance.

12. The metal-theft detection device of claim 11, wherein the circuitry is configured:
to determine, based on the measured voltage, if a pre-determined voltage criterion has been satisfied; and
to cause the wireless communications module to transmit the wireless message based on the measured voltage only if it is determined that the pre-determined voltage criterion has been satisfied.

13. The metal-theft detection device of claim 11, wherein the circuitry is configured:
to determine, based on the measured resistance, if a pre-determined resistance criterion has been satisfied; and
to cause the wireless communications module to transmit the wireless message based on the measured resistance only if it is determined that the pre-determined resistance criterion has been satisfied.

14. The metal-theft detection device of claim 11, further comprising a battery, wherein the circuitry is configured:
when the mains electricity circuit is energised, to utilise power from the mains electricity circuit; and
when the mains electricity circuit is de-energised, to utilise power from the battery.

15. The metal-theft detection device of claim 11, wherein the device is adapted for connection with an electrical plug for plugging into an electrical socket of the mains electricity circuit such that, when the device is connected to the electrical plug, the first sensing terminal is electrically connected to an earth terminal of the electrical plug and the second sensing terminal is electrically connected to a neutral terminal of the electrical plug.

16. The metal-theft detection device of claim 11, comprising an electrical plug for plugging into an electrical socket of the mains electricity circuit, the first sensing terminal being electrically connected to an earth terminal of the electrical plug and the second sensing terminal being electrically connected to a neutral terminal of the electrical plug.

17. The metal-theft detection device of claim 11, the circuitry comprising:
an analogue to digital converter for converting analogue signals indicative of the measured resistance into digital signals indicative of the measured resistance.

18. The metal-theft detection device of claim 17, wherein the wireless message transmitted by the wireless communications module based on the measured resistance is based on the digital signal indicative of the measured resistance.

19. The metal-theft detection device of claim 11, the circuitry comprising:
an analogue to digital converter for converting analogue signals indicative of the measured voltage into digital signals indicative of the measured voltage.

20. The metal-theft detection device of claim 19, wherein the wireless message transmitted by the wireless communications module based on the measured voltage is based on the digital signal indicative of the measured voltage.

21. The metal-theft detection device of claim 11, configured to cause the wireless communications module to transmit the wireless message including location information.

* * * * *